Figure 5:
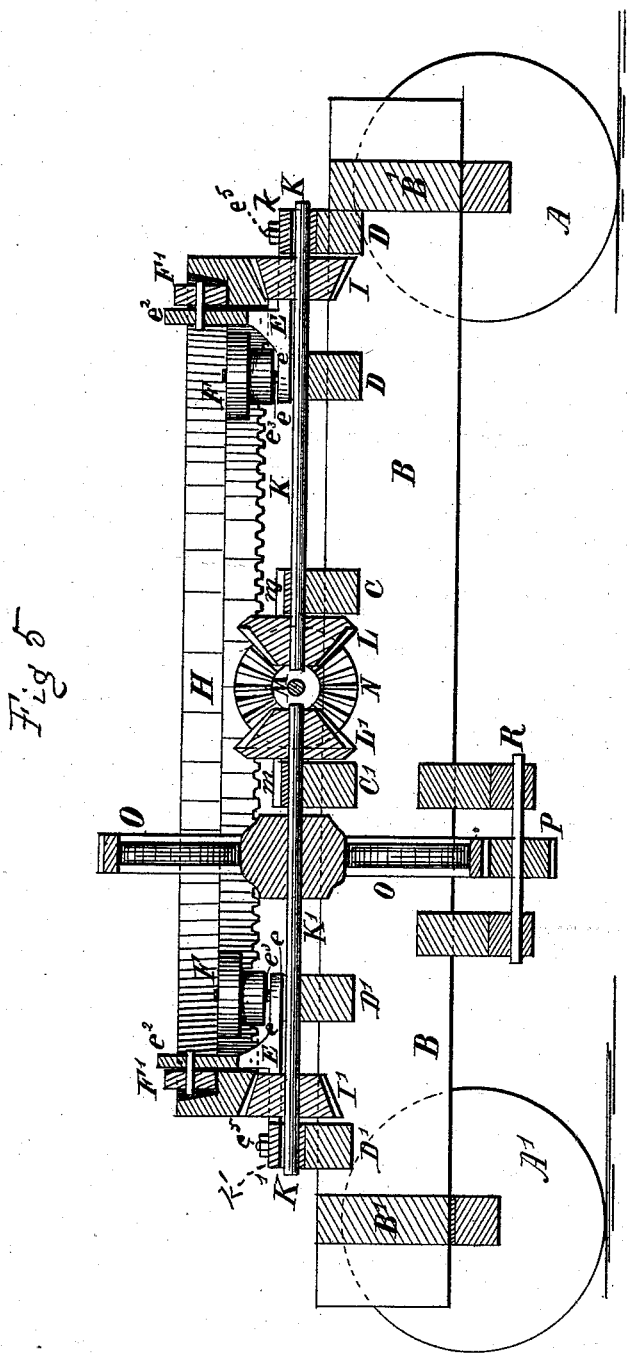

2 Sheets—Sheet 1.
J. H. ELWARD.
Horse-Power.
No. 215,444. Patented May 20, 1879.
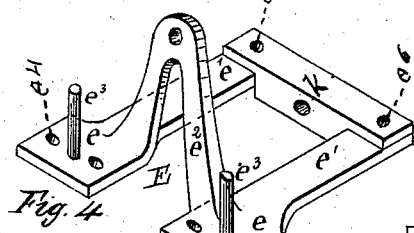
Fig. 4
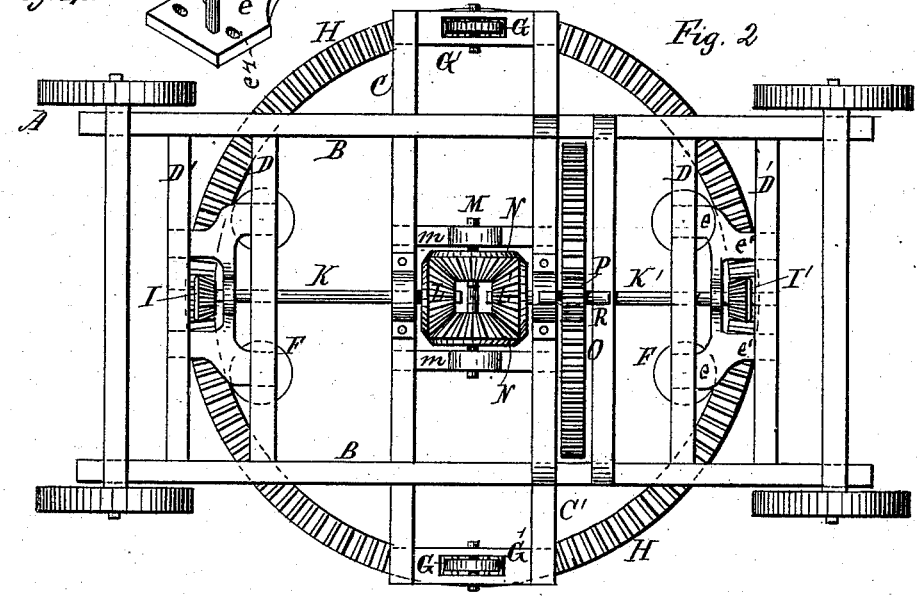
Fig. 2
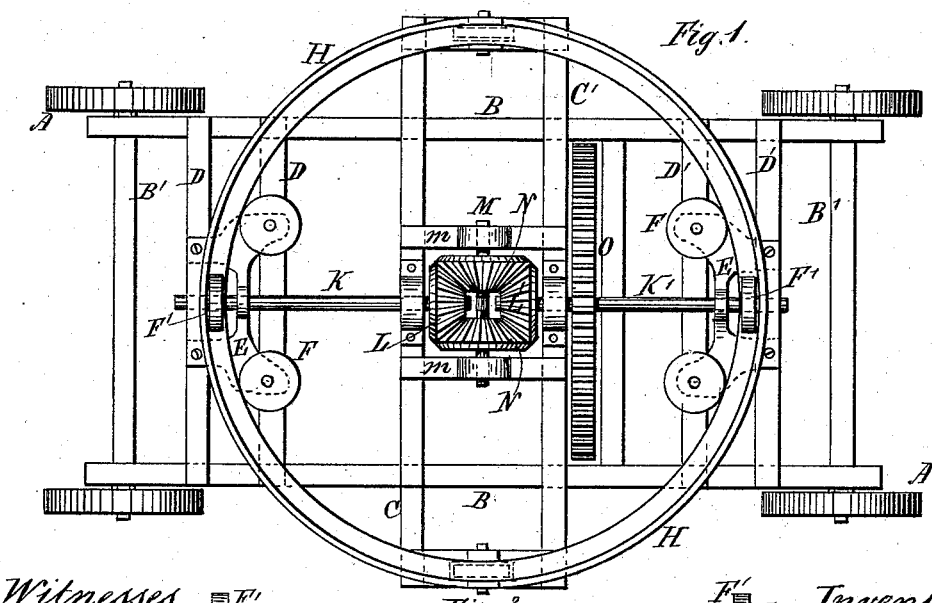
Fig. 1
Fig. 3
Witnesses
Henry Orth
N. N. Bliss
Inventor
John H. Elward
H. H. Doubleday
atty.

2 Sheets—Sheet 2.

J. H. ELWARD.
Horse-Power.

No. 215,444.  Patented May 20, 1879.

Witnesses.
Henry Orth
Alfred L. Leonard

Inventor
John H. Elward
pr. W H Doubleday
atty.

UNITED STATES PATENT OFFICE

JOHN H. ELWARD, OF STILLWATER, MINNESOTA.

IMPROVEMENT IN HORSE-POWERS.

Specification forming part of Letters Patent No. 215,444, dated May 20, 1879; application filed November 29, 1878.

*To all whom it may concern:*

Be it known that I, JOHN H. ELWARD, of the city of Stillwater, in the county of Washington and State of Minnesota, have invented certain new and useful Improvements in Horse-Powers; and I do hereby declare that the following is a full, clear, and exact description of the invention, which will enable others skilled in the art to which it appertains to make and use the same, reference being had to the accompanying drawings, and to letters of reference marked thereon, which form a part of this specification.

The first part of my invention relates to a novel combination and arrangement of gears and shafting in a horse-power, whereby power is transmitted from diametrically-opposite sides of a master-wheel provided with cogs upon one side only to a shaft arranged upon one of the radii of said master-wheel, and in a horizontal plane parallel therewith, thence to a tumbling-rod shaft arranged below said radial shaft and parallel thereto.

The second part of my invention relates to a novel construction of a bracket adapted to support the anti-friction guiding-rollers, which are employed for the purpose of guiding and supporting the opposite sides of the master-wheel adjacent to the outer ends of the radial shafts.

Figure 1 is a top or plan view of my invention. Fig. 2 is a bottom view. Fig. 3 is a transverse section of the master-wheel. Fig. 4 is a detached view of the supporting bracket and bearing for the outer end of the radial shaft. Fig. 5 is a vertical section taken on line $x\,y$, Fig. 1.

In the drawings, A A' are supporting and carrying wheels; B, the side girts, and C C' D D' transverse girts, constituting rectangular frame-work, upon which the operative parts of the power are supported. H is the master-wheel, provided upon its lower face with cogs, and with an upwardly-projecting flange, $h$, leaving within its periphery a seat or track, as shown in Fig. 3. I I' are bevel-pinions, keyed to the outer ends of the radial shafts K K'. The inner ends of these shafts are supported in suitable bearings attached to the cross-girts C C', respectively. The outer ends are supported in bearings $k$, (see Fig. 4,) which are secured to D D' by means of the bolts $e^5$, Fig. 5, passing through holes $e^6$. (See Fig. 4.)

Power is applied to the master-wheel H by means of sweeps attached thereto in any usual or desired manner, it (the master-wheel) being supported upon anti-friction rollers G, mounted in bearings G', which, in turn, are supported upon the outer ends of the girts C C'.

In order to maintain the master-wheel in proper working relation to the pinions I I', I employ three supporting and guiding rollers upon each of the two opposite sides of the wheel immediately adjacent to the pinions, these rollers being mounted upon a bracket, E, constructed as follows: Referring to Fig. 4, it will be seen that this bracket consists of a bifurcated standard, $e^2$, provided with base-plates $e\,e$, which base-plates are expanded rearward into arms $e^1\,e^1$. The bifurcated standard is provided near its upper end with a hole, in which is secured a horizontal stud-pin, carrying an anti-friction guiding-roller, F', Fig. 1, and each bed-plate $e$ is provided with a vertical stud-pin, $e^3$, on which is mounted a friction-roller, F.

The bed-plates $e$ are bolted to the cross-girts D, and from an examination of the drawings it will be seen that the thrust or strain imparted to the rollers F F' by the master-wheel tend to force the upper end of the standard $e^2$ inward—that is, toward the center of the master-wheel—and thus there is a tendency to release the master-wheel from properly meshing with the pinions I I', and to effectually resist this tendency; and insure that under all circumstances there shall be a proper working relation maintained between these parts, I extend the arms $e^1\,e^1$ rearward or outward, and bolt them fast to the girts D' D' by the same bolts which secure the bearings $k$ to said girts, the bolts $e^5$ passing through both the bearings $k$ and the ends of the arms $e^1$, thus forming a practically rigid metallic connection between the outer ends of the shafts K K', the pinions I I', and the rollers F F', which guide the movements of the master-wheel relative to the pinions.

O is a spur-gear keyed to shaft K', and meshing with a pinion, P, keyed to the tumbling-rod shaft R, which is arranged below the shaft K', and in parallel planes thereto. (See Figs. 2 and 5.)

Thus it will be seen that both the tumbling-rod shaft R and the radial shaft K' are in planes parallel horizontally with the under face of the master-wheel; and it will be also seen that the pinions P and wheel O of both spur-gears and the pinion I' has so little bevel that it is practically a spur, thus insuring but a small loss of power from friction in driving these gears.

L L' are miter-gears keyed to the inner ends of shafts K K', and corresponding with miter-gears N N, which are mounted loosely upon a shaft, M, supported in bearings $m\ m$, which are attached to the girts C C'.

It will be seen that the shafts K K' are both in the same horizontal plane, rotating in opposite directions, and that the power from shaft K is transferred to shaft K', and thence to the spur-gear O, through the medium of these miter-gears.

It is regarded by many manufacturers of horse-powers as being very desirable to mount the tumbling-rod shaft longitudinally of the main frame, in order to provide it with bearings as far apart as possible, the bearing at one end of the shaft being sometimes mounted upon the hounds, which are attached to the front axle, and sometimes to the cross-girt at the extreme end of the rectangular main frame. Many combinations of gearing have been devised to permit such an arrangement of the tumbling-rod shaft, and it has always been regarded desirable to drive the tumbling-rod by means of a spur-gear mounted upon a shaft arranged radially to, and driven directly from, the master-wheel; and it will be seen that by my combination and arrangement of gears and shafts I am enabled to accomplish these desirable results, and to obtain the desired speed with but few gears because the width of the main frame enables me to use a driving-gear, O, of the size which is required to impart the desired speed to the tumbling-rod shaft, while at the same time all of the shafts are arranged in parallel planes, thus insuring the working of the power with comparatively little friction.

What I claim is—

1. The combination, in a horse-power, of the following elements, viz: a rectangular supporting-frame; a master-wheel provided upon one side only with cogs, and mounted to rotate in a horizontal plane above the rectangular frame; two short shafts arranged within the master-wheel and upon opposite radii thereof; a shaft arranged below the two short shafts and upon a line parallel therewith; a spur-pinion mounted upon the lower shaft, and meshing with a spur driving-gear mounted upon one of the upper short shafts; pinions upon the outer ends of the upper short shafts, and meshing with the master-wheel; bevel-gears mounted upon the inner of the upper short shafts, and connected with other each by means of two bevel-gears mounted upon a shaft supported between the inner ends of the upper short shafts at right angles thereto, and in the same horizontal planes, substantially as set forth.

2. In a horse-power, the herein-described brackets, consisting of the bifurcated standard $e^2$, bed-plate $e$, and arms $e^1$, provided with bearings for the friction-rollers, in combination with the girts D D', bearing $k$, and bolts $e^5$, adapted to the master-wheel and pinions I I', in proper working relation to each other.

In testimony that I claim the foregoing as my own I affix my signature in presence of two witnesses.

JOHN H. ELWARD.

Witnesses:
A. F. SANFTENBERG,
R. W. CHAMBERS.